United States Patent
Barthe et al.

(10) Patent No.: US 10,601,028 B2
(45) Date of Patent: Mar. 24, 2020

(54) METHOD FOR CUTTING AN ELECTRODE OF AN ELECTROCHEMICAL GENERATOR

(71) Applicant: Commissariat a l'energie atomique et aux energies alternatives, Paris (FR)

(72) Inventors: Benoit Barthe, Grenoble (FR); Jeremie Salomon, Villard-de-Lans (FR); Remi Vincent, Grenoble (FR)

(73) Assignee: Commissariat a l'energie atomique et aux energies alternatives, Paris (FR)

( * ) Notice: Subject to any disclaimer, the term of this patent is extended or adjusted under 35 U.S.C. 154(b) by 737 days.

(21) Appl. No.: 15/093,898

(22) Filed: Apr. 8, 2016

(65) Prior Publication Data

US 2016/0301064 A1    Oct. 13, 2016

(30) Foreign Application Priority Data

Apr. 9, 2015    (FR) ..................... 15 53048

(51) Int. Cl.
*H01M 4/04*      (2006.01)
*H01M 4/66*      (2006.01)
(Continued)

(52) U.S. Cl.
CPC ....... *H01M 4/0471* (2013.01); *B23K 26/0846* (2013.01); *B23K 26/38* (2013.01);
(Continued)

(58) Field of Classification Search
CPC ............ B23K 2101/38; B23K 2103/05; B23K 2103/08; B23K 2103/10; B23K 2103/12;
(Continued)

(56) References Cited

U.S. PATENT DOCUMENTS

| 2005/0069768 A1 | 3/2005 | Martinet et al. |
| 2008/0263855 A1 | 10/2008 | Li et al. |
| 2010/0028767 A1* | 2/2010 | Inose .................... H01M 4/139 429/128 |

FOREIGN PATENT DOCUMENTS

| FR | 2 832 859 A1 | 5/2003 |
| JP | 1976-035196 | 3/1976 |

(Continued)

OTHER PUBLICATIONS

French Preliminary Search Report with Written Opinion dated Oct. 2, 2015 in French Application 15 53048 filed on Apr. 9, 2015 (with English Translation of Categories of Cited Documents).

(Continued)

*Primary Examiner* — Michael G Hoang
(74) *Attorney, Agent, or Firm* — Oblon, McClelland, Maier & Neustadt, L.L.P.

(57) ABSTRACT

A method for cutting an electrode of an electrochemical generator including a metal sheet with a laser beam of a power lower than or equal to 600 W, one face of the metal sheet being partially coated with a thinly layered band called the cutting band, the optical absorption factor of which for an emission wavelength of the laser beam is higher than or equal to 0.5 and preferably higher than or equal to 0.8, and extends so as to define a cutting path, in which the laser beam is focused on the cutting band and the laser beam is animated with a relative movement with respect to the electrode so as to travel the cutting path.

10 Claims, 3 Drawing Sheets

(51) Int. Cl.
- *H01M 4/139* (2010.01)
- *H01M 4/13* (2010.01)
- *B23K 26/38* (2014.01)
- *H01M 10/0585* (2010.01)
- *H01M 4/1393* (2010.01)
- *H01M 4/133* (2010.01)
- *B23K 26/40* (2014.01)
- *H01M 10/0525* (2010.01)
- *B23K 26/08* (2014.01)
- *B23K 103/04* (2006.01)
- *B23K 103/08* (2006.01)
- *B23K 103/10* (2006.01)
- *B23K 103/12* (2006.01)
- *B23K 103/16* (2006.01)
- *B23K 101/38* (2006.01)

(52) U.S. Cl.
CPC .......... *B23K 26/40* (2013.01); *H01M 4/0404* (2013.01); *H01M 4/13* (2013.01); *H01M 4/133* (2013.01); *H01M 4/139* (2013.01); *H01M 4/1393* (2013.01); *H01M 4/661* (2013.01); *H01M 10/0525* (2013.01); *H01M 10/0585* (2013.01); *B23K 2101/38* (2018.08); *B23K 2103/05* (2018.08); *B23K 2103/08* (2018.08); *B23K 2103/10* (2018.08); *B23K 2103/12* (2018.08); *B23K 2103/172* (2018.08)

(58) Field of Classification Search
CPC .... B23K 26/00; B23K 26/0006; B23K 26/38; B23K 26/40; B23K 26/0846; B23K 2103/172; H01M 4/0438; H01M 4/0471; H01M 4/0404; H01M 4/13; H01M 4/139; H01M 4/661; H01M 4/133; H01M 4/1393; H01M 10/0525; H01M 10/0585

USPC .............. 219/121.6, 61, 64, 67, 72, 121.61, 219/121.64, 121.67, 121.72
See application file for complete search history.

(56) References Cited

FOREIGN PATENT DOCUMENTS

| | | |
|---|---|---|
| JP | 1980-030813 | 3/1980 |
| JP | 1991-032486 | 2/1991 |
| JP | 1992-034871 | 2/1992 |
| JP | 2001-176501 | 6/2001 |
| JP | 2010-034009 | 2/2010 |
| JP | 2011-243402 | 12/2011 |
| JP | 2012-221912 | 11/2012 |
| KR | 10-2008-0101725 | 11/2008 |
| WO | WO 2008/134053 A1 | 11/2008 |

OTHER PUBLICATIONS

Rahul Patwa, et al., "Investigation of Different Laser Cutting Strategies for Sizing of Li-Ion Battery Electrodes", ICALEO 2012 congress Proceedings (31th International Congress on Applications of Lasers & Electro-Optics), 2012, 7 pgs.

Rahul Patwa, et al., "High Speed Laser Cutting of Electrodes for Advanced Batteries", ICALEO 2010 Congress Proceedings (29$^{th}$ International Congress on Applications of Lasers & Electro-Optics), 2010, 8 pgs.

Ali Gokhan Demir, et al., "Remote cutting of Li-ion battery electrodes with infrared and green ns-pulsed fibre lasers", The International Journal of Advanced Manufacturing Technology, 2014, vol. 75, (9-12), 12 pgs.

Translation of Japanese Office Action dated Oct. 23, 2019 in Japanese Patent Application No. 2016-076336.

\* cited by examiner

RELATED ART

METHOD FOR CUTTING AN ELECTRODE OF AN ELECTROCHEMICAL GENERATOR

BACKGROUND

Technical Field

The technical field of the invention is that of methods for producing electrodes for an electrochemical generator, and more particularly that of electrode-cutting methods. The invention is in particular applicable to the electrodes of lithium-based electrochemical accumulators.

Prior Art

A lithium electrochemical generator, for example a Li-ion battery, functions on the principle of insertion and deinsertion (or intercalation/deintercalation) of lithium into at least one electrode. It includes at least one lithium-based accumulator, one example of which is schematically illustrated in the exploded, perspective view in FIG. 1.

The accumulator 10 comprises two electrodes 20a, 20b that are placed on either side of an electrically insulating separator 30 that is intended to receive or form an ion exchange electrolyte. The electrodes 20a, 20b each include an electrically conductive carrier 40a, 40b, taking the form of a metal sheet, that performs a function of collection of the electrical current, the metal sheet being partially covered with what called an active layer 50a, 50b including an electrochemically active material.

By way of example, the negative electrode may comprise an active graphite layer of a few tens of microns thickness, which layer is deposited on a copper sheet of a few tens of microns thickness. The positive electrode may be formed from an active layer produced from a mixture of a plurality of materials, including an electrochemically active material, for example a lithiated transition-metal oxide, electrically conductive particles and a polymer binder providing the mixture with its mechanical strength. The active layer partially covers an aluminium sheet of a few tens of microns thickness.

To produce the electrodes, customarily the metal sheet 40a, 40b is coated with an electrode ink that comprises one or more various materials composing the active layer, these materials being dissolved or dispersed in a solvent. The coating step may be carried out by screen printing, flexographic printing, rotogravure printing or by ink-jet printing. After drying of the ink to evaporate the solvent, an active layer 50a, 50b is obtained that partially or entirely covers the metal sheet 40a, 40b. The electrode 20a, 20b thus obtained is then cut to the desired profile, the shape of which may include one or more protruding lateral bands 41a, 41b for distribution of electrical current, and/or a margin 42a, 42b that encircles all or some of the active layer 50a, 50b. A peripheral margin, that extends right around the perimeter of the active layer, may thus be necessary when an electrically insulating seal is placed around the active layers and the electrolyte and mechanically bears against the peripheral margin of each electrode.

The electrode may be cut before the step of assembling the various portions of the accumulator, for example using a mechanical technique to slit the electrode, or to even after the assembly step, when a multilayer stack has been obtained the cutting of which allows a plurality of separate accumulators to be obtained.

In this regard, FIG. 2 illustrates a perspective view of a laser cutting system 60 for obtaining lithium-based accumulators, such as described in document WO 91/11287. The method associated with this cutting system firstly includes the step in which a stack taking the form of a multilayer sheet 70 including a positive electrode, an electrically insulating separator and a negative electrode, is produced. This stack is then cut by means of a laser beam 80 incident on the external face 43 of one of the sheets, i.e. on the face opposite the face covered with the active layer (not shown). In particular, when the sheet is made of aluminium or copper, the face intended to be illuminated by the laser beam is covered with a film made of a peelable inert plastic, for example of polypropylene or polyethylene. The laser source may be a $CO_2$ source delivering a power comprised between 0.5 and 600 W, and operating in a continuous-wave regime or a pulsed mode.

However, this exemplary cutting method has the drawback of requiring, when the sheet is made of aluminium or copper, the use of a peelable protective film that coats the face of the sheet which is intended to be illuminated by the laser beam. The method then includes an additional step of removing the film and optionally of cleaning the sheet to remove residues of the protective film.

Moreover, this method does not allow an electrode to be cut with a beam incident on the internal face thereof, i.e. on the side of the active layer. Specifically, it would be necessary to cover the face of the metal sheet with a peelable protective film, which would then also cover the active layer. The subsequent removal of the protective film would risk damaging the active layer.

SUMMARY OF THE INVENTION

The aim of the invention is to at least partially remedy the drawbacks of the prior art, and more particularly to provide a simplified method for cutting an electrode of an electrochemical generator including a metal sheet, by means of a laser beam of low or moderate power, and that especially permits the cutting to be carried out on the internal face of the electrode.

For this purpose, the invention provides a method for cutting an electrode of an electrochemical generator including a metal sheet by means of a laser beam of a power lower than or equal to 600 W. According to the invention, one face of the metal sheet is partially coated with a thinly layered band called the cutting band, the optical absorption factor of which for an emission wavelength of said laser beam being higher than or equal to 0.5 and preferably higher than or equal to 0.8, and extending over said face so as to define a cutting path. The laser beam is focused on the cutting band and the laser beam is animated with a relative movement with respect to the electrode so as to travel said cutting path.

Said face of the metal sheet is partially coated with a thin layer called the active layer, which is adapted to react electrochemically during operation of the generator, said cutting band extending at least partially around the active layer.

The cutting band is, over at least one section of the cutting path, located away from the active layer. The expression "located away" is understood to mean that the cutting band does not make contact, locally, with the active layer, thereby forming locally an intermediary zone of the face of the metal sheet that is not coated by the cutting band and by the active layer. The cutting band is at least partially separate from the active layer, in particular when the cutting band is located on the same face of the sheet as the active layer.

The following are some preferred but nonlimiting aspects of this cutting method:

The cutting band may be made of one or more materials, at least one material of which is common with the one or more materials of the active layer, and preferably includes the same material(s) as that or those of the active layer.

The active layer may be produced from a mixture of a plurality of materials including an electrochemically active material, the cutting band being produced from a mixture of the same materials as those of the active layer, with a proportion by weight of the active material lower than the proportion by weight of the active material in the mixture of the active layer.

The active layer may comprise a carbon-containing component and/or a component based on lithiated metal oxide.

The cutting band may comprise a carbon-containing component and/or a component based on lithiated metal oxide.

The metal sheet may be produced from aluminium or copper or nickel or stainless steel.

The invention also relates to a method for producing an electrode for an electrochemical generator including the steps of:

depositing a thinly layered band called the cutting band, the optical absorption factor of which, for a given wavelength range, being higher than or equal to 0.5 and preferably higher than or equal to 0.8, on a portion of one face of a metal sheet of an electrode, said cutting band extending over said face so as to define a cutting path; and depositing a thin layer called the active layer, which is adapted to react electrochemically during operation of the generator, on said face of the metal sheet, said cutting band extending at least partially around the active layer and being located, on at least one section of the cutting path, away from the active layer; and cutting said electrode according to the method of any one of the preceding features.

Preferably, a thin layer called the active layer, which is adapted to react electrochemically during operation of the generator, is deposited on said face of the metal sheet, said cutting band extending at least partially around the active layer.

Advantageously the steps of depositing the active layer and cutting band on said face of the metal sheet are carried out simultaneously.

Advantageously the steps of depositing the active layer and cutting band on said face of the metal sheet are carried out by screen printing.

The invention also relates to an electrochemical generator electrode obtained by the production method according to any one of the preceding features.

The invention also relates to an electrochemical generator comprising at least one electrode obtained by the production method according to any one of the preceding features.

BRIEF DESCRIPTION OF THE DRAWINGS

Other aspects, aims, advantages and features of the invention will become more clearly apparent on reading the following detailed description of preferred embodiments thereof, which description is given by way of nonlimiting example and with reference to the appended drawings in which, apart from FIGS. 1 and 2 which have already been described.

DETAILED DESCRIPTION OF PARTICULAR EMBODIMENTS

In the figures and in the rest of the description, the same references represent identical or similar elements. In addition, the various elements are not shown to scale, in order to increase the clarity of the figures.

Figure 1:
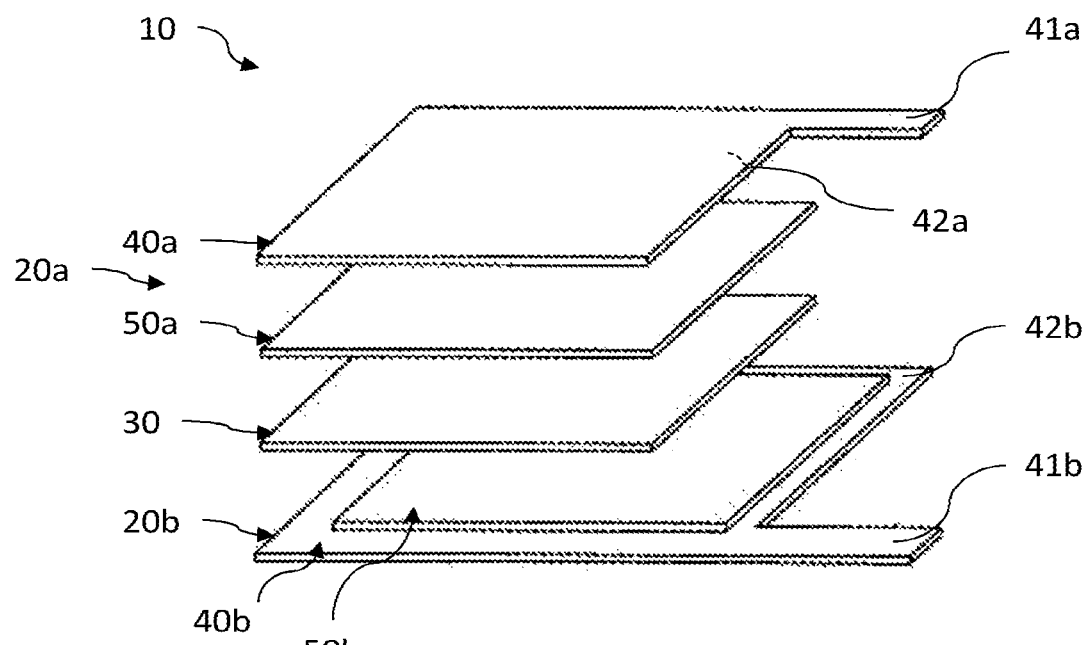
Figure 2:
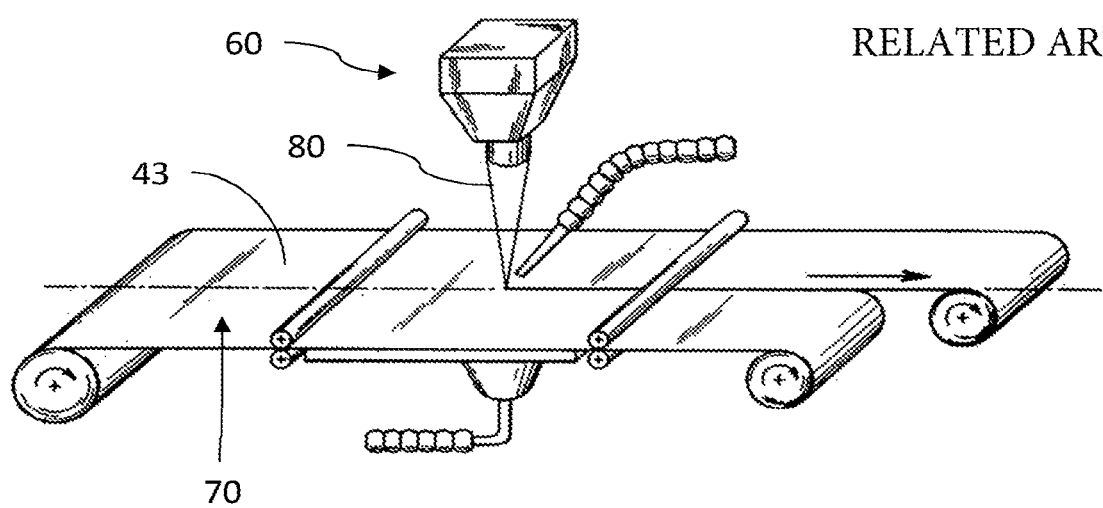
Figure 3:
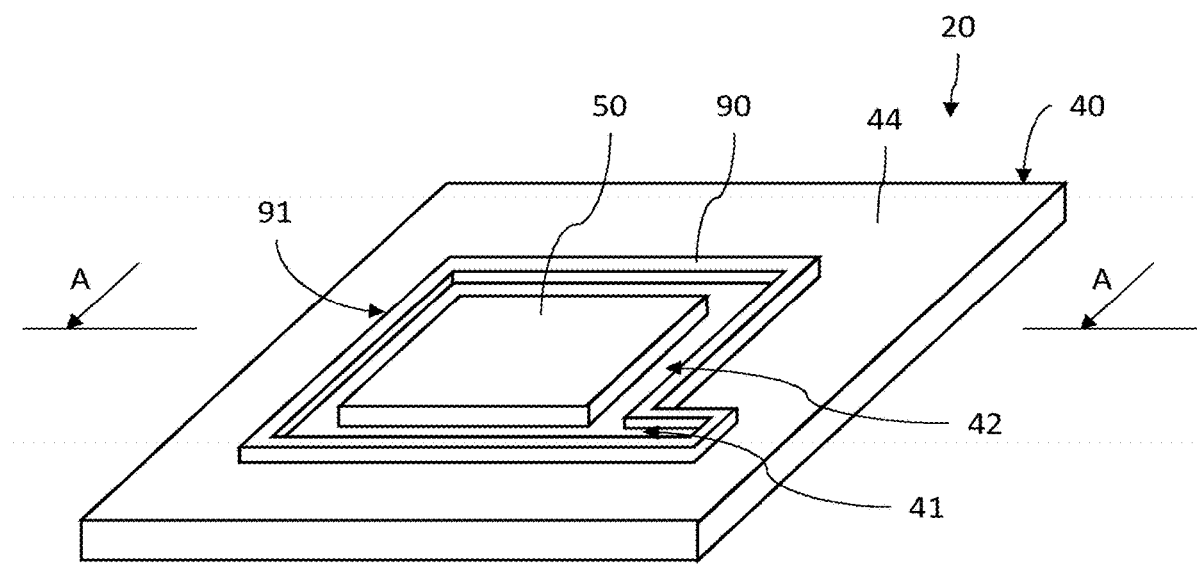
FIG. 3 is a schematic perspective view of an electrode according to one embodiment, including a metal sheet partially covered with an active layer and a cutting band.
Figure 4:
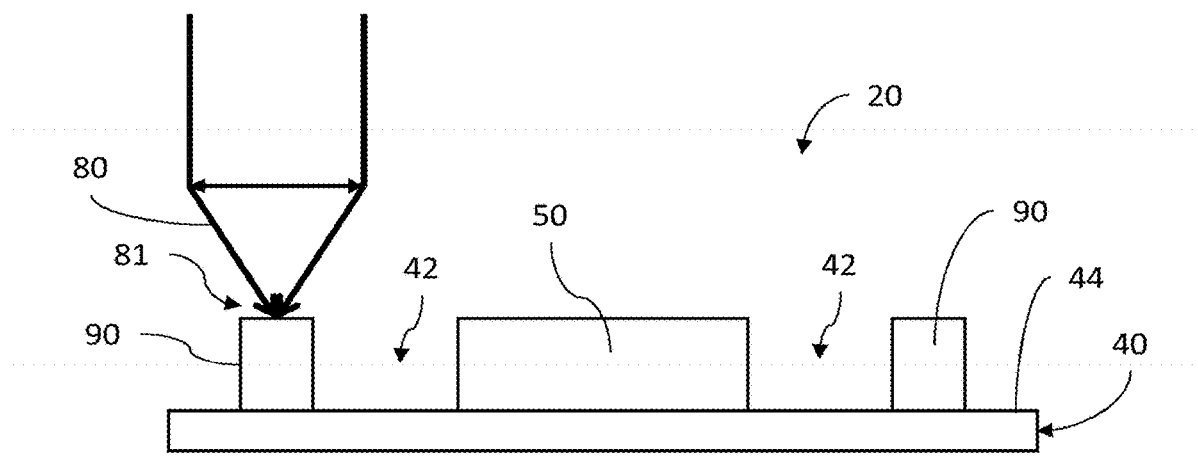
FIG. 4 is a cross-sectional view of the electrode shown in FIG. 3 in the cross-sectional plane A-A.

FIG. 3 illustrates one electrode 20 of a lithium-based electrochemical accumulator which electrode is intended to be cut by a laser according to one embodiment of the cutting method, and FIG. 4 is a cross-sectional view of the electrode shown in FIG. 3 in the cross-sectional plane A-A.

The electrode 20 includes an electrically conductive carrier 40 taking the form of a metal sheet one of the faces 44 of which, called the internal face, is partially coated with an active layer 50 and with a cutting band 90 that partially or entirely encircles the latter.

The metal sheet 40 performs a function of collector of electrical current. It is formed from a sheet or band produced from a metal the thickness of which is about ten microns, for example 10 to 20 μm. The metal may be chosen from copper, aluminium, nickel and stainless steel, or may be another suitable material. The optical reflectivity, i.e. the ratio of the intensity of the optical flux reflected to the intensity of the incident optical flux, for an emission wavelength of the cutting laser beam, is higher than or equal to 0.8, or even to 0.9. Thus, by way of example, aluminium and copper have a reflectivity coefficient of 0.99 for a wavelength of about 10 μm.

The active layer 50 is adapted to react electrochemically during operation of the accumulator. For this purpose, it includes an active material the nature of which depends on the polarity of the electrode. By way of example, the active material of the negative electrode may be, inter alia, graphite or $Li_4Ti_5O_{12}$, and that of the positive electrode may be, inter alia, a composite such as $LiFePO_4$ or a lithiated transition-metal oxide such as $LiCoO_2$ or $LiNi_{1/3}Mn_{1/3}Co_{1/3}O_2$ (also called NMC).

It may also be formed from a mixture of a plurality of materials, one of which is the electrochemically active material. By way of example, the active layer of the positive electrode customarily includes, apart from the aforementioned active material, an electrically conductive material, for example in particle form, and a binder mechanically holding the mixture together.

The active layer 50 here takes the form of a thin layer, i.e. a layer the thickness of which is about a few microns to a few hundred microns, and the one or more constituent materials of which have been deposited on the surface of the carrier so as to form said layer. It has, seen from above, a substantially rectangular or square shape, for example of size ranging from 25×25 mm² to 500×500 mm².

The electrode 20 also includes a thin narrow layer, called the cutting band 90, taking the form of a thin band. It thus has a longitudinal dimension larger than its transverse dimensions of width and thickness. This cutting band 90 is a thin layer, the transverse width of which may be of the order of magnitude of the thickness, the latter being comprised between 5 and 200 μm, or even between 20 and 100 μm. It here extends over the internal face 44 of the sheet 40, and extends at least partially around the active layer 50.

The cutting band 90 is produced from one or more materials chosen so that the band has an optical absorption factor, for a given wavelength corresponding to the emission wavelength of the cutting laser beam, higher than or equal to 0.5 and preferably higher than or equal to 0.8. The absorption factor A is here defined as being substantially equal to 1−R−T, where R is the reflectivity factor of the layer in question (ratio of the reflected optical intensity of the laser beam to the incident optical intensity) and T is the transmission factor of the layer (ratio of the transmitted optical intensity of the laser beam to the incident optical intensity).

It is advantageous, when the one or more materials of the active layer have an absorption factor higher than or equal to 0.5, or even to 0.8, to choose the same materials to produce the cutting band, in a different or equal proportion by weight. In this case, the step of depositing the cutting band on the internal face of the sheet may be carried out simultaneously to that of depositing the active layer. By way of example, the cutting band may be produced from graphite, or even from a mixture containing a lithiated metal oxide, electrically conductive particles, in particular of graphite, or any other suitable material, such as powdered metals, kaolin or bentonite.

The cutting band 90 extends along a longitudinal extent that defines a cutting path 91 intended to be followed by the focal point 81 of the laser beam 80 during the cutting (FIGS. 3 and 4). Thus, the cutting path 91 delimits the border of the electrode obtained after cutting. The arrangement of the cutting band 90 with respect to the active layer 50 allows margins 42 and/or one or more lateral bands 41 for distribution of electrical current to be defined. In this respect, the example in FIG. 3 shows a cutting band 90 located away from the active layer 50 over the entire length of the cutting path 91, thus defining a continuous peripheral margin 42. The expression "located away" is understood to mean that the cutting band does not make locally contact with the active layer, thereby locally forming an intermediary zone of the face 44 of the metal sheet that is not coated by the cutting band 90 and by the active layer 50. The cutting band is at least partially separate from the active layer, in particular when the cutting band is located on the same face of the sheet as the active layer. In addition, the cutting path 91 here comprises a lateral projection so as to define a lateral band 41 for distributing the electrical current. It will be noted that the cutting path 91 in FIG. 3 is given merely by way of illustration and that any type of cutting path is possible.

Figure 5A:
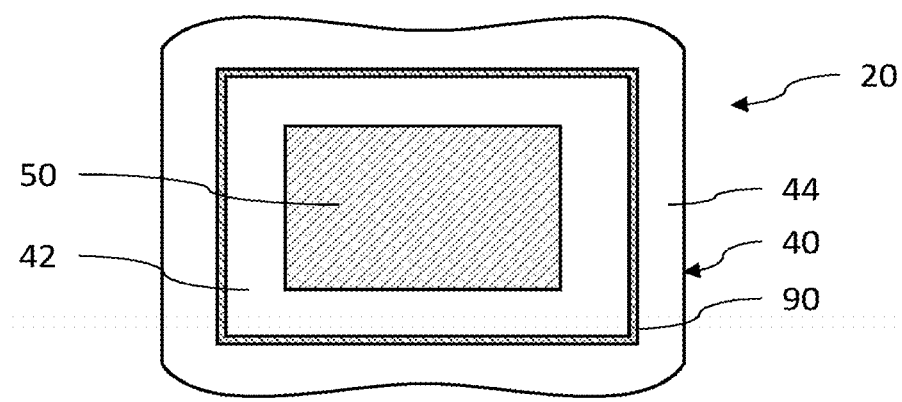
FIGS. 5a to 5c are schematic top views of a plurality of variant electrodes the cutting band of which follows different cutting paths.
Figure 5B:
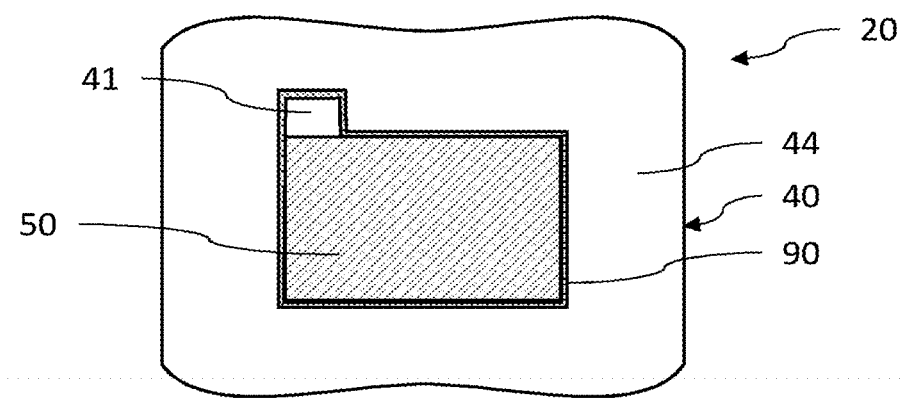
Figure 5C:
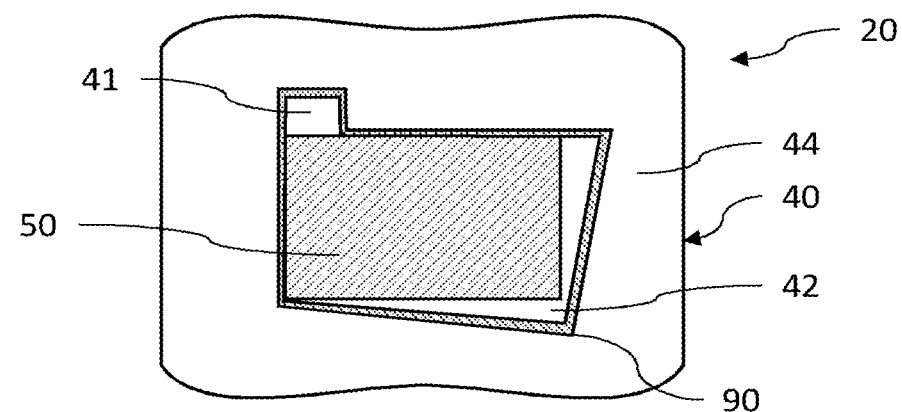

FIGS. 5a to 5c schematically illustrate top views of various arrangements of the cutting band with respect to the active layer.

In FIG. 5a, the cutting band 90 extends around and away from the active layer 50, so as to define a continuous peripheral margin 42 of a substantially constant width. By way of example, the active layer 50 has lateral dimensions of 14×17 mm$^2$ to 500×500 mm$^2$ and the cutting band 90 has a width of 2 mm to 20 mm and extends around a perimeter of 70 mm to 2000 mm, at a distance of 5 mm to 50 mm from the border of the active layer 50.

In FIG. 5b, the cutting band 90 extends around and in contact with the active layer 50 over substantially the entire perimeter thereof, outside of a zone in which it departs therefrom so as to define a lateral band 41 for distributing the electrical current. This lateral band 41 is here 5×5 mm$^2$ to 25×25 mm$^2$ in size.

In FIG. 5c, the cutting band 90 extends around the active layer 50, in contact therewith in certain zones and away therefrom in other zones. It departs locally from the active layer 50 in order to form a lateral band 41 for distributing the current. It also departs therefrom in other zones to form margins 42 of various shapes.

Advantageously, the cutting band 90 forms a sacrificial layer, i.e. a layer intended to disappear during the laser cutting. For this reason, the thickness and width of the cutting band 90 are dimensioned so that the latter is entirely disintegrated by the laser beam 80 during the cutting.

With the aim of carrying out the cutting of the electrode described above, provision is made for a laser including a laser source associated with an optical focusing system (which are not shown). As is known per se, a system for controlling the atmosphere around the focal point of the beam may be provided, and means for evacuating fumes and/or residues generated during the cutting.

The laser source may be a gas source, a solid-state source or any other type of source suitable for emitting a laser beam at a given emission wavelength, in a continuous-wave regime or in a pulsed mode, with a power lower than or equal to 600 W and preferably higher than or equal to 25 W and for example comprised between 50 and 500 W, or even between 100 and 200 W. By way of example, the laser source may be a $CO_2$ laser source emitting a laser beam of a wavelength of about 10 μm, in a continuous-wave regime, of a power of about 100 W. The cutting speed is here about 100 mm/s, but is preferably correlated to the power of the laser. Thus, the cutting speed will possibly be high, for example equal to a few tens of centimetres per second, when the power of the laser is about a few hundred watts, and will possibly be low, for example a few centimetres per second, when the power is about a few tens of watts.

The optical focusing system focuses the beam emitted by the source on the cutting band, for example on the upper surface thereof. The beam 80 then forms, on the cutting band 90, a focal point or spot 81 (FIG. 4).

Moreover, provision may be made for mechanical means to animate the laser with a relative movement with respect to the electrodes, so that the focal point follows the cutting path formed by the cutting band.

An exemplary method for cutting a negative electrode for a Li-ion accumulator will now be described. A stack formed from an electrode ink deposited on a copper sheet of 12 μm thickness is produced beforehand. The electrode ink here includes graphite in a proportion by weight of 96%, a cellulose-based binder in a proportion by weight of 2% and latex in a proportion of 2%, all in an organic solvent. The depositing step may be carried out by screen printing, but any other deposition technique may be used, for example flexographic printing, rotogravure printing, inkjet printing or spraying. The screen-printing screen, for example of a woven type, is dimensioned to deposit the ink on a desired area of the internal face of the sheet.

A layer intended to form the cutting band is then deposited; the longitudinal extent of this deposited layer forms a cutting path for the laser beam. In this example, the same electrode ink is intended to form the active layer and the cutting band. It is then advantageously deposited simultaneously, on the one hand on the area of the internal face of the sheet intended to receive the active layer, and on the other hand on the area of the internal face intended to receive the cutting band.

Alternatively, the step of depositing the electrode ink and that of depositing the cutting band may be carried out separately. Moreover, another electrode ink may be used to form the cutting band, including the same components as those of the ink intended to form the active layer but in a different proportion by weight.

Next, the stack obtained is dried, so as to evaporate the solvent. The drying may be carried out in an oven at 50° C. for a few minutes. Thus, the active layer and the cutting band are obtained. The stack may be rolled, for example at 80° C., so as to optimize the porosity of the active layer and/or that of the cutting band. The thickness of the active layer and that of the cutting band may here be of the order of about 50 to 100 µm.

Next, the stack is cut by focusing the laser beam of a continuous-wave $CO_2$ source of a power of 100 W and of an emission wavelength centred at 10 µm, on the surface of the cutting band. The focal point of the laser beam travels along the cutting path, at a cutting speed of about a few centimetres to a few tens of centimetres per second.

Thus, an electrode having the desired shape, optionally with at least one margin extending around all or some of the outline of the active layer and/or at least one lateral band of sheet that is intended to ensure the distribution of the electrical current, is obtained.

An exemplary method for cutting a positive electrode for a Li-ion accumulator will now be described. The positive electrode may be produced by laser cutting using a method similar to that described for the negative electrode. An electrode ink is obtained beforehand from a mixture, produced in an organic solvent, of an active material, for example NMC in a proportion by weight of 92%, of electrically conductive fillers, for example carbon black in a proportion by weight of 4%, and of a binder, for example polyvinylidene fluoride in a proportion of 4%. The electrode ink is deposited on the internal face of an aluminium sheet of 18 µm thickness for example by screen printing, on the area of the face of the sheet intended to receive the active layer.

Advantageously, when the active layer and the cutting band are produced from the same mixture of materials, the electrode ink is deposited simultaneously on the area of the face intended to receive the cutting band. Alternatively, the cutting band may be deposited in a separate step to that of the deposition of the active layer, especially when the cutting band is formed from different materials from those of the active layer, or of the same materials but in different proportions by weight. By way of illustration, when the cutting band includes the same materials as those of the active layer but in different proportions, it is possible to adjust the optical absorption in a range extending from about 0.75 to 0.95, and to obtain a thermal conductivity ranging from about 1 W/mK to 10 W/mK.

After a drying step and optionally a calendering step, a stack of an aluminium sheet the internal face of which is partially coated with an active layer of a thickness of about 100 µm, the latter being entirely or partially encircled by the cutting band which here has a thickness similar to that of the active layer, is obtained.

Next, the stack obtained is cut using a cutting method similar to that described above.

Thus, by using a cutting band of high optical absorption factor, which band is deposited on one face of the metal sheet, the method according to the various exemplary embodiments described above allows the electrode to be cut to the desired profile by means of a laser beam of moderate power, the latter being lower than or equal to 600 W.

In contrast to the example of the prior art described above, it is not necessary to use a peelable protective film to perform the cutting, thereby making it possible to simplify the method. In addition, it is possible to perform the cutting on the internal face of the sheet without having to coat this face and therefore also the active layer, with the protective film the subsequent removal of which risks degrading the active layer. The method thus allows cutting to be carried out at the desired distance from the active layer, optionally right next to the latter, depending on the desired application.

In addition, the method ensures the sheet is cut without degrading the active layer, despite the high thermal conductivity of the metal forming the sheet, because of the use of a laser beam of a moderate power. Cutting with a laser of moderate power also allows degradation of the electrode, inherent to mechanical cutting techniques, to be avoided. Specifically, mechanical cutting means apply forces to various portions of the electrode, which induce mechanical stresses that lead to a degradation of the mechanical strength of the electrode.

Moreover, by suitably dimensioning the transverse dimensions of the cutting band, the latter may be entirely disintegrated by the laser beam in the cutting step. The cutting band thus forms a sacrificial layer that entirely disappears after the cutting, thereby allowing a clear sheet border to be formed.

It is lastly possible to cut the metal sheet to the desired outline, in order thus to form the desired shape and number of margins and/or contact redistribution and electrical current collection portions.

Particular embodiments were described above. Various variants and modifications will be clear to those skilled in the art.

Thus, a method for cutting an electrode by means of a laser beam incident on the internal face of the electrode, i.e. with a cutting band located on the same face as the active layer, has been described. As a variant, the cutting band may be placed on the external face of the metal sheet, i.e. opposite the internal face, so as to form a cutting outline that encircles the active layer located on the internal face.

The invention claimed is:

1. A method for cutting an electrode of an electrochemical generator comprising a metal sheet with a laser beam of a power lower than or equal to 600 W, comprising:
    partially coating one face of the metal sheet with a thin layer band being a cutting band, the optical absorption factor of which, for an emission wavelength of said laser beam, being higher than or equal to 0.5, said cutting band extending over said face to define a cutting path, said face of the metal sheet being partially coated with a thin layer being an active layer, which is adapted to react electrochemically during operation of the generator, said cutting band extending at least partially around the active layer, and being located, on at least one section of the cutting path, away from the active layer; and
    focusing the laser beam on the cutting band and moving the laser beam with a relative movement with respect to the electrode to travel along said cutting path.

2. The cutting method according to claim 1, wherein the cutting band is made of one or more materials, at least one material of which is the same as one or more materials of the active layer.

3. The cutting method according to claim 2, wherein the active layer is produced from a mixture of a plurality of the one or more materials of the active layer, including an electrochemically active material, the cutting band being produced from a mixture of the same materials as those of the active layer, with a proportion by weight of the active material of the cutting band lower than a proportion by weight of the active material in the mixture of the active layer.

4. The cutting method according to claim 1, wherein the active layer comprises a carbon-containing component or a component based on lithiated metal oxide or comprises the carbon-containing component and the component based on lithiated metal oxide.

5. The cutting method according to claim 1, wherein the cutting band comprises a carbon-containing component or a component based on lithiated metal oxide or comprises the carbon-containing component and the component based on lithiated metal oxide.

6. The cutting method according to claim 1, wherein the metal sheet is produced from aluminium or copper or nickel or stainless steel.

7. The method according to claim 1, wherein the optical absorption factor is higher than or equal to 0.8.

8. A method for producing an electrode for an electrochemical generator comprising:

depositing a thin layer band being a cutting band, the optical absorption factor of which, for a given wavelength range which is an emission wavelength of a laser beam, being higher than or equal to 0.5 on a portion of one face of a metal sheet of the electrode, said cutting band extending over said face to define a cutting path;

depositing a thin layer being an active layer, which is adapted to react electrochemically during operation of the generator, on said face of the metal sheet, said cutting band extending at least partially around the active layer and being located, on at least one section of the cutting path, away from the active layer; and cutting said electrode with the laser beam of a power lower than or equal to 600 W, the cutting including:

focusing the laser beam on the cutting band and moving the laser beam with a relative movement with respect to the electrode to travel along said cutting path.

9. The method for producing an electrode according to claim 8, wherein the steps of depositing the active layer and cutting band on said face of the metal sheet are carried out simultaneously.

10. The method for producing an electrode according to claim 9, wherein the steps of depositing the active layer and cutting band on said face of the metal sheet are carried out by screen printing.

\* \* \* \* \*